(12) United States Patent
Loach et al.

(10) Patent No.: US 7,376,749 B2
(45) Date of Patent: May 20, 2008

(54) HEURISTICS-BASED PEER TO PEER MESSAGE ROUTING

(75) Inventors: Scot Loach, Waterloo (CA); Don Bowman, Waterloo (CA)

(73) Assignee: Sandvine Incorporated, Waterloo, Ontario (CA)

( * ) Notice: Subject to any disclaimer, the term of this patent is extended or adjusted under 35 U.S.C. 154(b) by 506 days.

(21) Appl. No.: 10/216,676

(22) Filed: Aug. 12, 2002

(65) Prior Publication Data

US 2004/0044790 A1      Mar. 4, 2004

(51) Int. Cl.
    *G06F 15/173* (2006.01)
(52) U.S. Cl. ............... 709/238; 709/241; 709/244; 370/355; 370/360
(58) Field of Classification Search ........ 709/205–206, 709/221, 224, 227, 238, 241–242, 202, 204, 709/244; 370/219, 355–356, 360; 710/316
See application file for complete search history.

(56) References Cited

U.S. PATENT DOCUMENTS

| | | | | |
|---|---|---|---|---|
| 6,055,568 | A * | 4/2000 | Adams ................... | 709/221 |
| 6,938,095 | B2 * | 8/2005 | Basturk et al. .......... | 709/238 |
| 2002/0147810 | A1 * | 10/2002 | Traversat et al. ........ | 709/224 |
| 2002/0184311 | A1 * | 12/2002 | Traversat et al. ........ | 709/204 |
| 2003/0009587 | A1 * | 1/2003 | Harrow et al. ........... | 709/238 |
| 2003/0050959 | A1 * | 3/2003 | Faybishenko et al. .... | 709/202 |
| 2003/0177186 | A1 * | 9/2003 | Goodman et al. ........ | 709/205 |
| 2003/0182428 | A1 * | 9/2003 | Li et al. ................. | 709/227 |
| 2003/0204619 | A1 * | 10/2003 | Bays ...................... | 709/238 |
| 2004/0090913 | A1 * | 5/2004 | Scudder et al. .......... | 370/219 |
| 2005/0080858 | A1 * | 4/2005 | Pessach .................. | 709/206 |

OTHER PUBLICATIONS

Crespo, Garcia-Molina: "Routing indices for Peer-to-Peer systems" XP002252824, Jul. 2, 2002, Vienna, Austria.*

Crespo, Garcia-Molina: Routine Indices for Peer to Peer Systems: ICDCS 2002 22nd International Conference on Distributed Computing Systems, Jul. 2-5, 2002, XPOO2252824 Vienna, Austria.

Abstract, p. 3, left-hand column, pasragraph 3.1 Query, Processing. In. a. Distributed. Sear Chp. P2P2.S p. 4, left-hand column, paragraph 4. Routing,Indices, p. 7, left-hand column, paragraph 7.1 Modeling. Search. Mechanisms. in.a.p2p System p. 8.

Tang, Xu, Mahalingam: "Peersearch: Efficient Information Retrieval in Peer-to-Peeer Networks" Hewlett-Packard, Jul. 12, 2002, XP002252825.

Page 1, paragraph 1 Introduction; p. 6, paragraph 5, Related. Work.

Saroiu, Krishna Gummadi, Gribble: A measurement sudy of Peer to Peer file sharing systems: Proceedings of Multimedia Computing and Networking 2002 MMCN'02, Jan. 2002, XP002252826 San Jose, CA, USA, paragraph '4 . . . To.Peer.Ro.Peer.System. Designes!

(Continued)

*Primary Examiner*—Thu Ha Nguyen
(74) *Attorney, Agent, or Firm*—Borden Ladner Gervais LLP

(57) ABSTRACT

The present invention is directed to a system and method for administering Peer to Peer (P2P) query messages within a P2P network. The present invention collects a plurality of metrics for each host that it is aware of in a P2P network, most often by a host information or query hit message. The metrics collected aid in determining a set of P2P hosts best able to fulfill a query message, without having knowledge of specific content. The metrics collected also aid in managing query messages in that they determine when to drop query messages or when to resend query messages.

15 Claims, 10 Drawing Sheets

OTHER PUBLICATIONS

Sam Joseph: Neurogrid: Semantically Routing queries in Peer to Peer Netwokrs: Peer to Peer Computing and Networking 2002, vol. 2376, No. 2002, May 19-24, 2002, pp. 202-214, XP002252827, Pisa, Italy, the whole document.
Abstract, p. 3, left-hand column, pasragraph 3.1 Query, Processing. In. a. Distributed. Sear Chp. P2P2.S p. 4, left-hand column, paragraph 4. Routing,Indices, p. 7, left-hand column, paragraph 7.1 Modeling. Search. Mechanisms. In.a.p2p System p. 8, date unknown.
Page 1, paragraph 1 Introduction; p. 6, paragraph 5, Related. Work, date unknown.

* cited by examiner under the conditions outlined in the claims, by whatever means available.

HEURISTICS-BASED PEER TO PEER MESSAGE ROUTING

FIELD OF THE INVENTION

The present invention relates to the field of Peer to Peer (P2P) messaging in a computer network. More specifically, the present invention relates to determining from which P2P hosts to request content, without the use of a content index.

BACKGROUND OF THE INVENTION

Peer to peer (P2P) network protocols are used to exchange content among peers on a network. Generally one peer will be connected to a number of other peers. When a peer wants to find content, the peer transmits a query message to some of the peers it is connected to. This query message travels through the P2P network and elicits query responses from peers that have content that satisfies the query.

In a broadcasting model of P2P networks, a query is sent through the network by assigning it a Time-to-live (TTL) and broadcasting it to all connected peers. The connected peers decrement the TTL and broadcast it to all of their connected peers, and the query continues through the network in this fashion until the TTL reaches zero. This method works well when each peer is connected to a small number of other peers, and when there are few cycles in the network. However, the number of times the query is forwarded grows exponentially with the number of connected peers. For a peer that connects to thousands of other peers, broadcasting queries is not feasible, since the network would become congested with messaging traffic.

One method of resolving the possibility of network congestion is to maintain an index of the content available through each connection. Queries may then be forwarded to connections that have the content being searched for. However, keeping such an index may not be feasible. For example, due to the size of the index or the dynamic nature of the content.

Thus there is a need for a system and method to intelligently route queries to connected peers, without knowing the specific content available at each peer. The present invention addresses this need.

SUMMARY OF THE INVENTION

The present invention relates to the routing of query messages in a peer to peer network.

One aspect of the present invention is a heuristics based peer to peer query routing system, the system comprising:
a) a network cache module;
b) a connection metrics module operatively connected to the network cache module;
c) a scheduler module operatively connected to the connection metrics module; and;
d) a query cache module operatively connected to the scheduler module.

In another aspect of the present invention there is provided a method of routing messages in a peer to peer network, the method comprising the step of upon receiving a message determining the type of the message and if the message is a query, forwarding the message to a heuristically selected host.

In another aspect of the present invention there is provided a method for managing queries in a peer to peer network device the method comprising the steps of:
a) issuing a timer event; and b) if the time for a host known to the device has expired, discarding the host.

In another aspect of the present invention, a scheduler module is initialized by creating a set of all known hosts, and when a request is made to connect to a host providing a host from the set.

In yet another aspect of the present invention, there is provided a system for routing queries in a peer to peer network, the system utilizing heuristics to determine the best host to forward a query to.

DETAILED DESCRIPTION OF THE INVENTION

Figure 1:
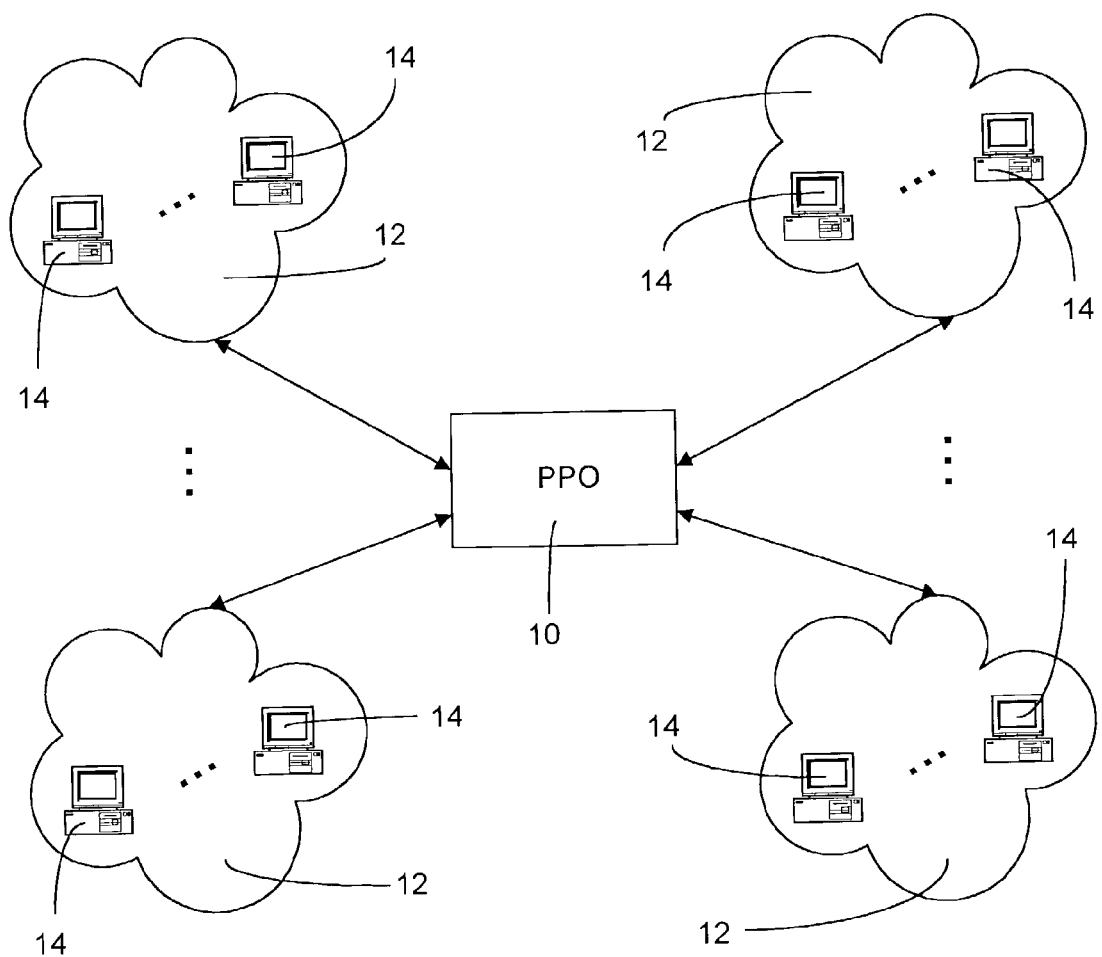
FIG. 1 is a block diagram of networks connected to a Peer to Peer Optimizer (PPO)

The present invention uses heuristics to route a query to a subset of connected peers, without knowing the specific content available through any connected peers. The present invention may be implemented within a Path Optimizer for Peer-to-Peer Networks (PPO). An example of a PPO is disclosed in a co-pending application titled "Path Optimizer For Peer To Peer Networks", application Ser. No. 10/138,336, filed on May 6, 2002, the entire contents of which are incorporated herein by reference FIG. 1 is a block diagram of networks connected to a PPO. Peer to Peer optimizer (PPO) 10 monitors all P2P traffic between a plurality of networks 12. Examples of networks 12 include but are not restricted to; a network controlled by an ISP, a corporate network, or a University network. Networks 12 would typically be connected to PPO 10 via the Internet, but that is not a requirement of the present invention. Within networks 12 are one or more nodes 14. A node 14 is any computer that is capable of receiving or transmitting P2P data and is referred to hereinafter as a "peer".

Any network 12 that is capable of providing or requesting P2P traffic may make use of PPO 10. The present invention is preferably part of PPO 10, however it is not the intent of the inventors to restrict the present invention to use solely within PPO 10.

Figure 2:
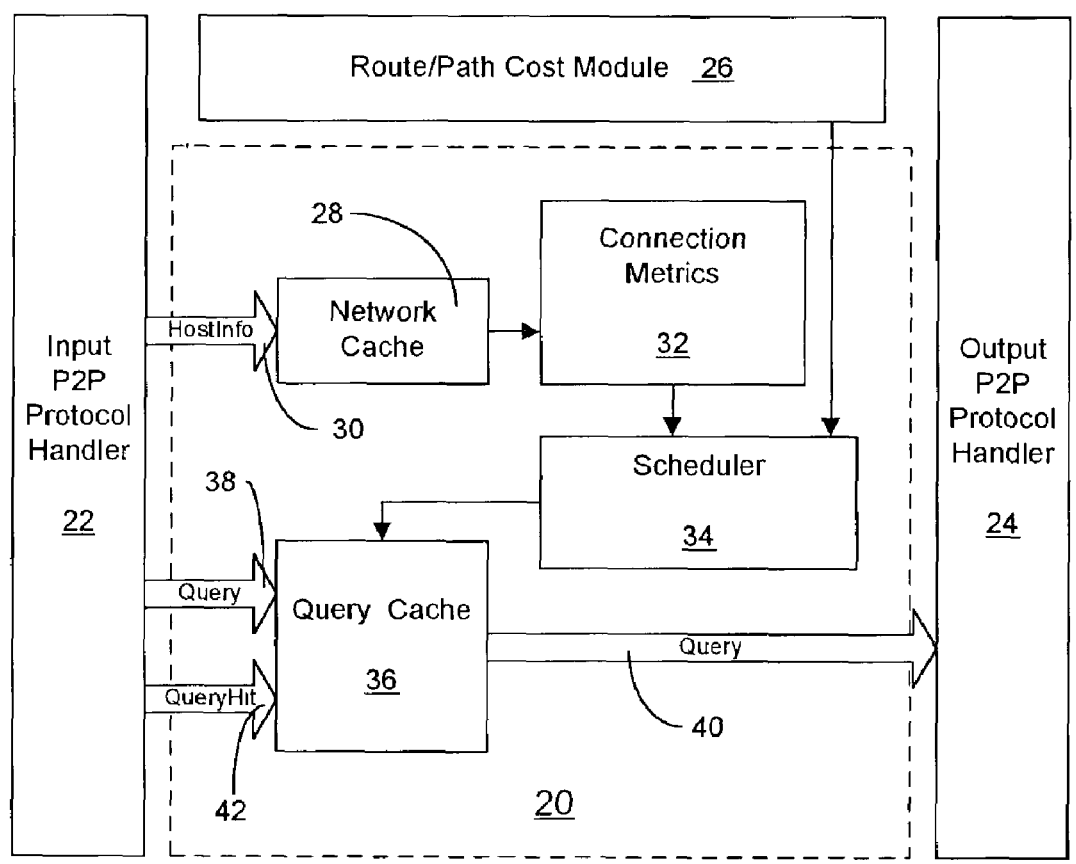
FIG. 2 is a block diagram of the components of the present invention.

FIG. 2 is a block diagram of the components of the present invention, shown as heuristics based query routing system 20. The large arrows show the flow of data obtained from messages received from different P2P communication protocols. The small arrows show the flow of information between modules in system 20. System 20 may make use of three components in PPO 10 namely: input P2P protocol handler 22, output P2P protocol handler 24 and route/path cost module 26. Handler 22 parses a specific P2P protocol and passes the data received to components within system 20. There may be many instances of handler 22, one or more for each different protocol. Handler 24 transmits forwarded messages. Route/Path Cost Module 26 categorizes connected peers into different "classes", where each class has a cost relative to each other class. The information about the cost of a connection is used by the present invention to select a subset of connections that will be candidates for a scheduling algorithm. The invention does not require this information to work, and it is not the intent of the inventors to restrict the invention to require module 26. Similarly, as one skilled in the art will understand, handlers 22 and 24 may be replaced by equivalent components that serve the same function.

Handler 22 passes data from three types of P2P messages to system 20, namely:

1) Host Information messages 30 contain information about a peer that contains files that may be downloaded, such peers are referred to as "hosts", in a P2P network. This information varies according to the specific P2P protocol, but may consist of the amount of content offered by a host, the bandwidth available to a host, the uptime of a host, etc. These messages may be called by other names within specific protocols, and protocol-specific handlers may obtain some of the information from different types of messages. For example, in the Gnutella P2P protocol, a host Information message 30 is referred to as a "Pong, and information about whether a host is behind a firewall is obtained from a query hit message.

2) Query messages 38 contain a description of content that a peer is searching for, and a globally unique identifier (GUID) that is used to route query hits back to the originating peer.

3) Query hit messages 40 contain information about content that matched a query. Each query hit message contains a list of results from a single peer, and a GUID that matches the GUID of the query. This GUID is used to route the query hit back to the originator of the query.

The data flow shown in FIG. 2 is not intended to map to specific protocol messages, but rather show the communication of this information, which is normalized by handler 22 into the general messages types described.

Network cache module 28 maintains a cache of all hosts that have been detected in a P2P network. Hosts may be detected in many ways. One way to learn about hosts is by an explicit "Host Information Message" 30. For example, the Gnutella P2P protocol specifies a "Pong" message to advertise the presence of a host, and information about it. Another way to learn about hosts is by inspecting the contents of messages that are routed through module 20. For example, a "Query Hit" message 38 may have been received that has been forwarded through several hosts. This message will have the IP address and listening port of the host that sent it, and although only the final receiver of the message requires this information, the information can be used to learn about the host that sent the query hit message 38.

Network cache module 28 saves collected information about hosts, and passes relevant information on to connection metrics module 32, which is described below. Since network cache 28 has no general way of knowing when a host is removed from the network, it removes cache entries after a certain amount of time has passed without any reference to that host. When a directly connected host disconnects from the network, that host and any hosts that were reachable through that host are removed from the cache.

Connection metrics module 32 maintains a set of heuristics based metrics for each P2P connection that is established with system 20. These metrics are obtained from network cache module 28. Some of the metrics are attributes of the connected host, and others are aggregates calculated from all hosts reachable through the connected host. Module 32 provides metrics to scheduler 34, which uses them as input to a weight-based scheduling algorithm. The specific metrics used are described below.

Scheduler 34 utilizes the input from connection metrics module 32 and route/path cost module 26 (if available) in a probabilistic weight-based algorithm. For example, a weighted round-robin algorithm may be used. The output of the algorithm is a sequence of connected hosts, which is used by query cache 36 to make forwarding decisions.

Query cache module 36 receives "Query" messages 38, makes a forwarding decision, and forwards the query to one or more specific connections vial query forwarding link 40. Query cache module 36 saves queries for a certain amount of time to allow them to be re-sent. Module 36 also receives query hit messages 42 and uses them to track in-progress queries. Queries expire from cache 36 after an expiry time. At expiry time, if the number of returned results is under a certain threshold, the query may be forwarded again, to a different set of hosts. This scheme of query feedback results in a savings in bandwidth, since the initial number of hosts a query must be forwarded to is reduced. Only queries searching for less common content should have to be re-forwarded.

Figure 3:
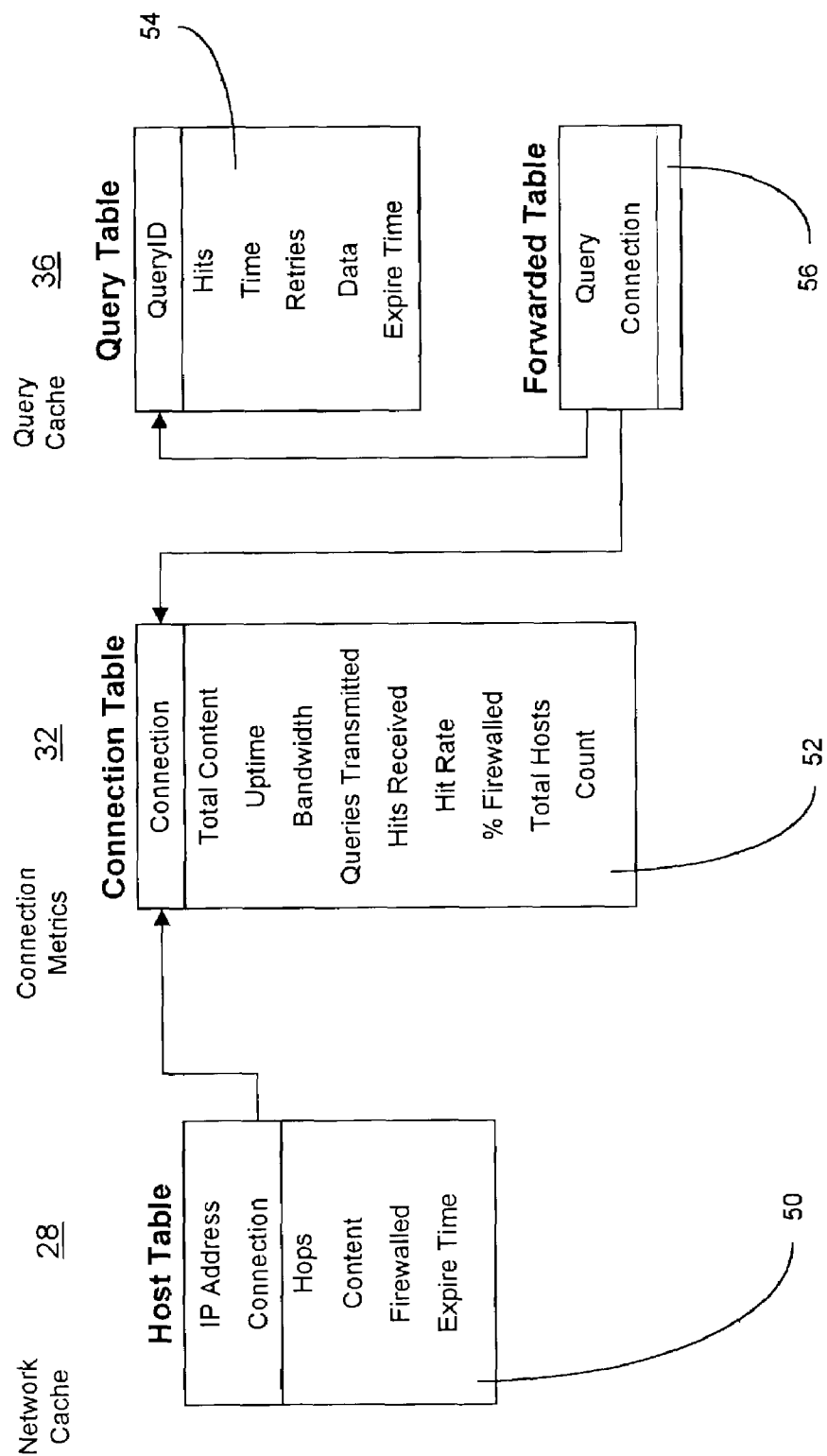
FIG. 3 is a block diagram of the data structures utilized by the present invention.

FIG. 3 is a block diagram of the data structures utilized by system 20. One skilled in the art will appreciate that any form of data structures may be utilized to store the data required for the present invention.

System 20 comprises four tables of data, namely: network host table 50, connection table 52, query table 54 and forwarded table 56. Host table 50 is utilized by network cache module 28, connection table 52 is utilized by connection metrics module 32 and both query table 54 and forwarded table 56 are utilized by query cache module 36. In FIG. 3, each of the tables 50, 52, 54 and 56 is shown as a block containing a list of fields. Fields above the first horizontal line are the "index" fields, and uniquely identify a row in a table.

Host table 50 is indexed by an "IP Address" field containing the address of a host, and a "Connection" field containing the IP address of a connection. A connection may be a network 12 that contains a plurality of nodes 14 (see FIG. 1). A connection may also be a single node. The "Connection" field of table 50 contains the IP address of a connection and the "IP Address" field contains the IP address of a node within the connection that can serve as a host. The connection field references a row in connection table 52, indexed by the "Connection" field of connection table 52. Connection table 52 is described in detail later. The "Hops" field contains the number of network hops to the host. The "Content" field is the amount of content advertised by the host. This may be measured in files, bytes, or some other unit. The "Firewalled" field is either on or off, depending upon whether or not the host is behind a firewall. The "Expire Time" field is used to expire hosts from the cache. Each time there is evidence that a host is still on the network, the value of this field is set to the current time plus a constant interval, for example 10 minutes. An entry (i.e. a row), is deleted from table 50 when the current time passes the value in the expire time field.

Connection table 52 contains the heuristics that are used by scheduler 34. Table 52 is indexed by the IP address of the connected host as shown by the "Host" field. The "Total Content" field contains an aggregation of all of the values contained in the "Content" field of host table 50. This provides a measure of the amount of content available through a connection. Connections with more content are given a higher weight by scheduler 34. The "Uptime" field contains the amount of time the connected host has been connected to the P2P network. This may be used to indicate the reliability of the host. Connections with a higher uptime are given a higher weight by scheduler 34. The "Bandwidth" field contains the amount of bandwidth to a connected node. This is useful in determining how many messages can be forwarded to the connected node, since a low-bandwidth node cannot support many messages in a short time. Scheduler 34 gives a higher weight to a higher bandwidth connection. The "Queries Transmitted" field contains a count of the number of queries that have been forwarded to the connection. The "Hits Received" field contains a count of the number of query hits that have been received from the connection. The value of the "Hit Rate" field is calculated by dividing the value in the "Queries Transmitted" field with the value in the "Hits Received" field. The value of the "Hit Rate" field indicates how well the connected network is at satisfying queries, and is a useful metric for scheduler 34. A high hit rate will be given a high weight by scheduler 34. The "% Firewalled" field is aggregated from the "Firewalled" fields of host table 50. A connection that leads to a network with a low number of firewalled hosts is given a higher weight by scheduler 34, since downloading from those hosts has a higher chance of success. The "Total Hosts" field provides an estimate of the size of the connected network. Forwarding queries to a large network generally gives a higher rate of success; therefore, larger networks are given a higher weight by scheduler 34. The "Count" field contains the number of times this host is connected. It is possible for a host to connect multiple times, and it is necessary to track this because the row should only be deleted when the count becomes zero.

These metrics are merely a few of the metrics that may be applied to improve the heuristics of P2P message routing. The design is such that other metrics may be easily added by adding fields (i.e. columns in the relational model) to host table 50 and connection table 52. It is not the intent of the inventors to require that the metrics suggested be always stored in a table, for example the value of the field "Hit Rate" in table 32 may be calculated as needed and not stored in table 32

Query cache module 36 utilizes two tables, query table 54 and forwarded table 56. Query table 54 is a cache of in progress queries. Each time a query is received by query cache module 36, the query is entered into table 54. The "QueryID" field contains the Global Unique Identifier (GUID) of the query, which is provided with the query. Any incoming queries that already have a GUID in table 54 are duplicates and may be dropped. The "Hits" field is initialized to 0 when a query is first forwarded. Whenever a query hit is returned, the value in the hits field is incremented by the number of results in the query hit. A query hit may contain multiple results in response to a query. The "Retries" field is initialized to 0 when the query is first forwarded. A query may be retried if the number of hits from the query have not met a threshold value (see FIG. 9). If a query is retried, the retries field is incremented. The "Data" field contains the actual query data, so that it may be retransmitted. The "Expire Time" field is used to clear the cache after a query has been in the network for a certain length of time. A time interval is set that is expected to be the maximum lifetime of a query on the network, by way of example, a minute.

Forwarded table 56 contains information on which connected hosts a query was forwarded to. It is filled in with the Query ID field of table 54 and the Host field of table 52 whenever a query is forwarded. On a re-query, this table is checked before forwarding to a host chosen by scheduler 34. If the host is already in table 56 for the query being forwarded, the query will not be forwarded to that connection again and another host is obtained from scheduler 34.

We will now refer to FIGS. 4 to 10 which are flowcharts describing the behaviour of system 20 for each possible input. To aid the reader in understanding FIGS. 4 to 10, the inventors advise also consulting FIGS. 2 and 3 to better understand the data and logic flow of the present invention.

Figure 4:
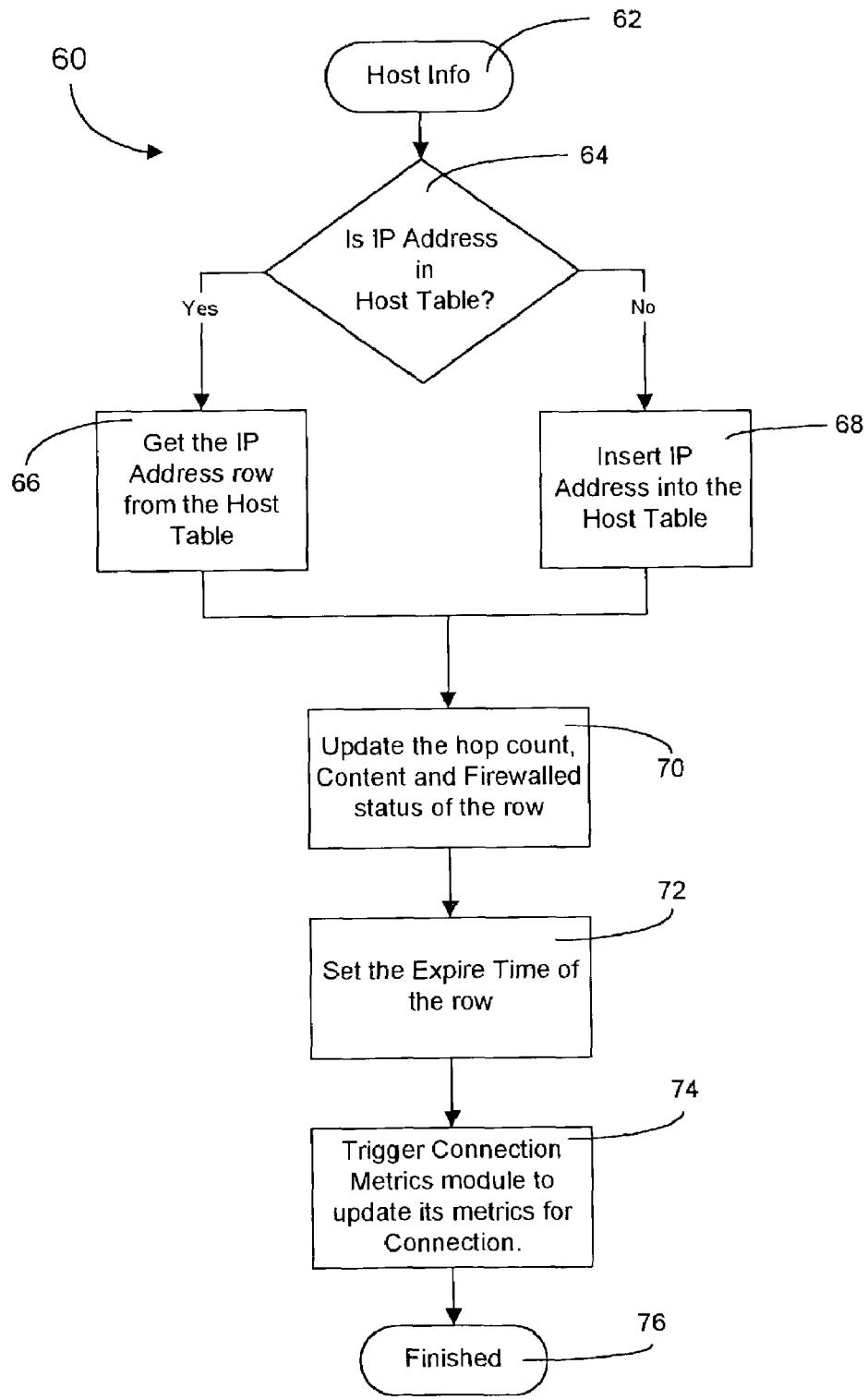
FIG. 4 is a flowchart of the logical flow of the reception of a host information message.

Referring now to FIG. 4 a flowchart of the logical flow of the reception of a host information message is shown generally as process 60. A host information message 30 (see FIG. 2) is received at step 62. At step 64 a test is made to determine if the IP Address provided by the host information message 30 is in host table 50 (see FIG. 3). If the IP address is in host table 50 the applicable row is determined at step 66. If the IP address is not in host table 50 a new row in host table 50 is created at step 68. At step 70 the hops, content and firewalled fields are updated for the relevant row based upon the information contained in the host information message. At step 72 the expire time field of the relevant row is set. In one embodiment this may be set at 10 minutes from the current time. At step 74 connection metrics module 32 is invoked to update its entry for the connection. Processing ends at step 76.

Figure 5:
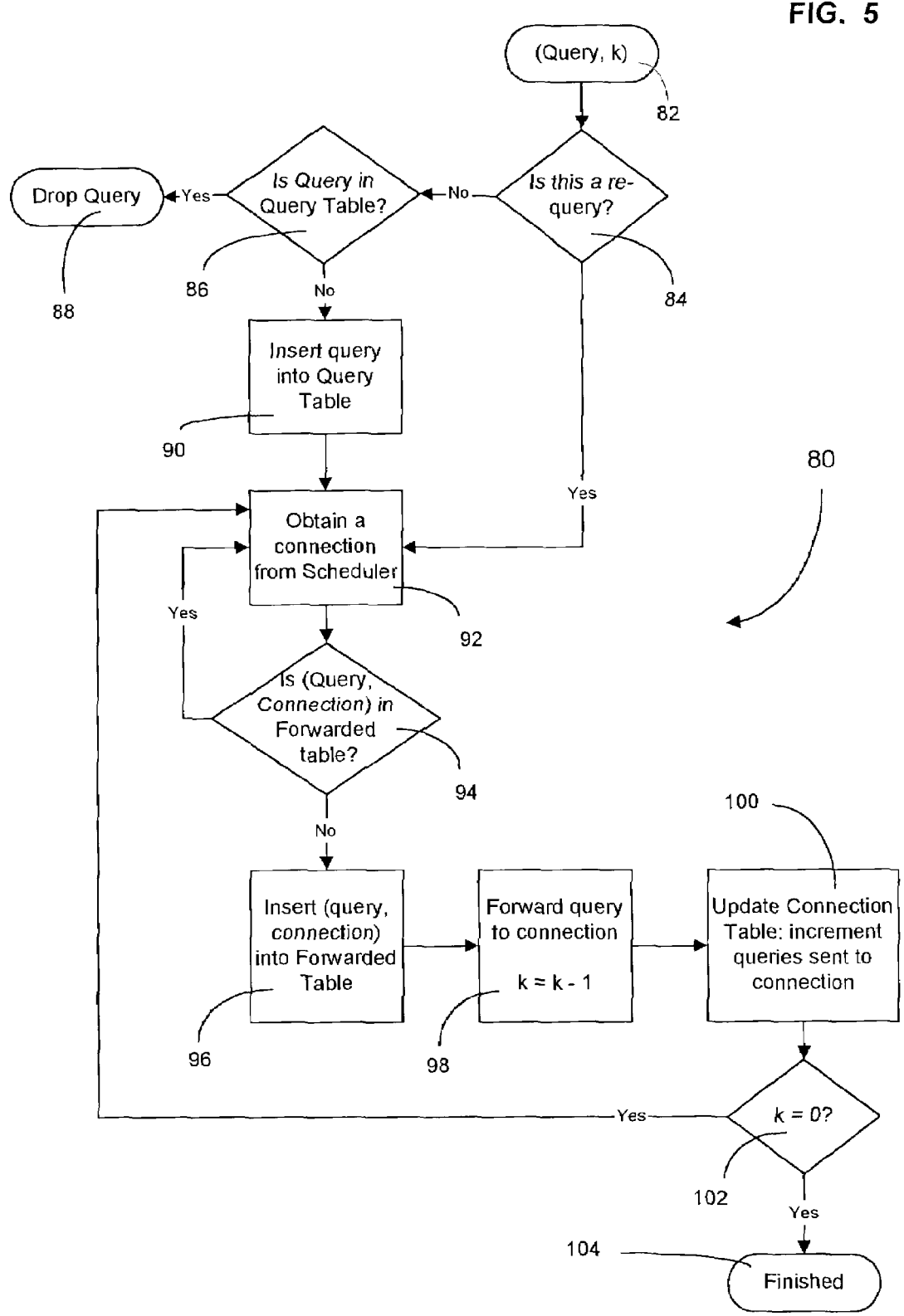
FIG. 5 is a flowchart of the logical flow of the reception of a query message.

Referring now to FIG. 5 a flowchart of the logical flow of the reception of a query message is shown generally as 80. Query message 38 (see FIG. 2) is received at step 82. The value of "k" is the number of connections query message 38 should be forwarded to, the value of k may be selected by the user when configuring system 20. A test is then made at step 84 to determine if this is a re-query. A re-query is submitted by step 196 of FIG. 9 and includes a flag indicating it is a re-query. A re-query is issued when the original query has not received enough hits to meet a threshold value. If the query is a re-query, processing moves to step 92. If the query is not a re-query, processing moves to step 86 where a test is made to determine if the query exists in query table 54, thus indicating it is a duplicate query. If the query already exists in query table 54 then the query has already been forwarded, so it is dropped at step 88. If the query is not in query table 54 it is inserted in query table 54 at step 90. Processing then moves to step 92 where the query is forwarded to a connection obtained from scheduler 34, k times. For each connection received from scheduler 34, forwarded table 56 is checked at step 94 to see if the query has already been forwarded to the connection; if it has, control returns to step 92 where a new connection is obtained from scheduler 34. At step 96 an entry is inserted into forwarded table 56 for the forwarded query. At step 98 the value of k is decremented as the query has been forwarded to a connection. At step 100 the "Queries Transmitted" value for the connection in connection table 52 is incremented. A test is then made at step 102 to determine if the value of k is equal to zero. If it is, processing finishes at step 104. If it is not, processing returns to step 92 to obtain another connection for the query.

Figure 6:
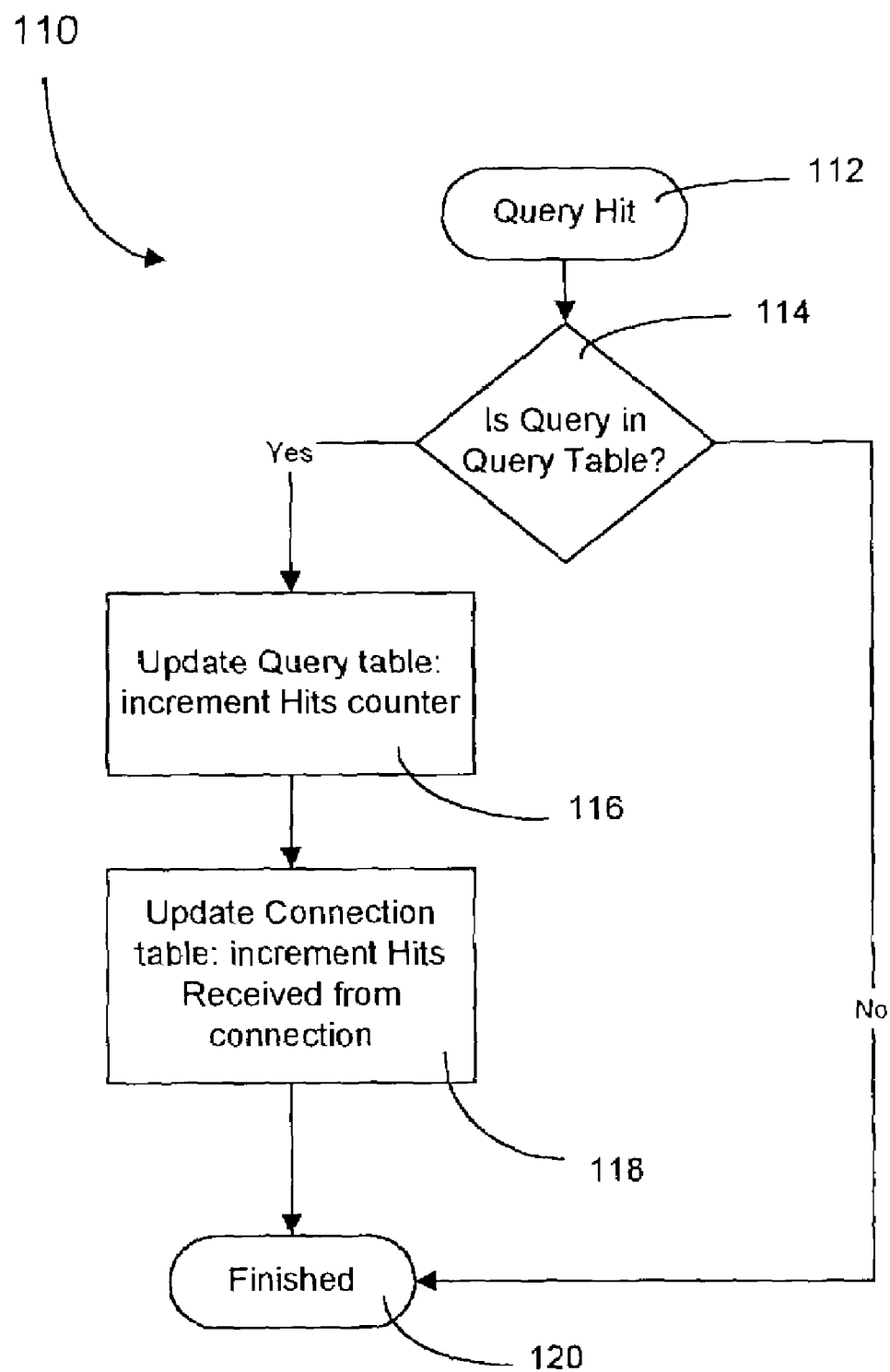
FIG. 6 is a flowchart of the logical flow of the reception of a query hit message

Referring now to FIG. 6 a flowchart of the logical flow of the reception of a query hit message is shown generally as 110. Query hit message 42 (see FIG. 2) is received at step 112. At step 114 a test is made to determine if a query corresponding to query hit 42 is present in query table 54, based upon the GUID of the query. If no corresponding query is present, processing ends at step 120 as this a spurious query hit message or a query hit message from an expired query. If query table 54 does contain a corresponding query, processing moves to step 116 where the "Hits" field of query table 54 is incremented by the number of results indicated in the query hit. Processing next moves to step 118 where the "Hits Received" field of connection table 52 is updated. Processing then ends at step 120.

Figure 7:
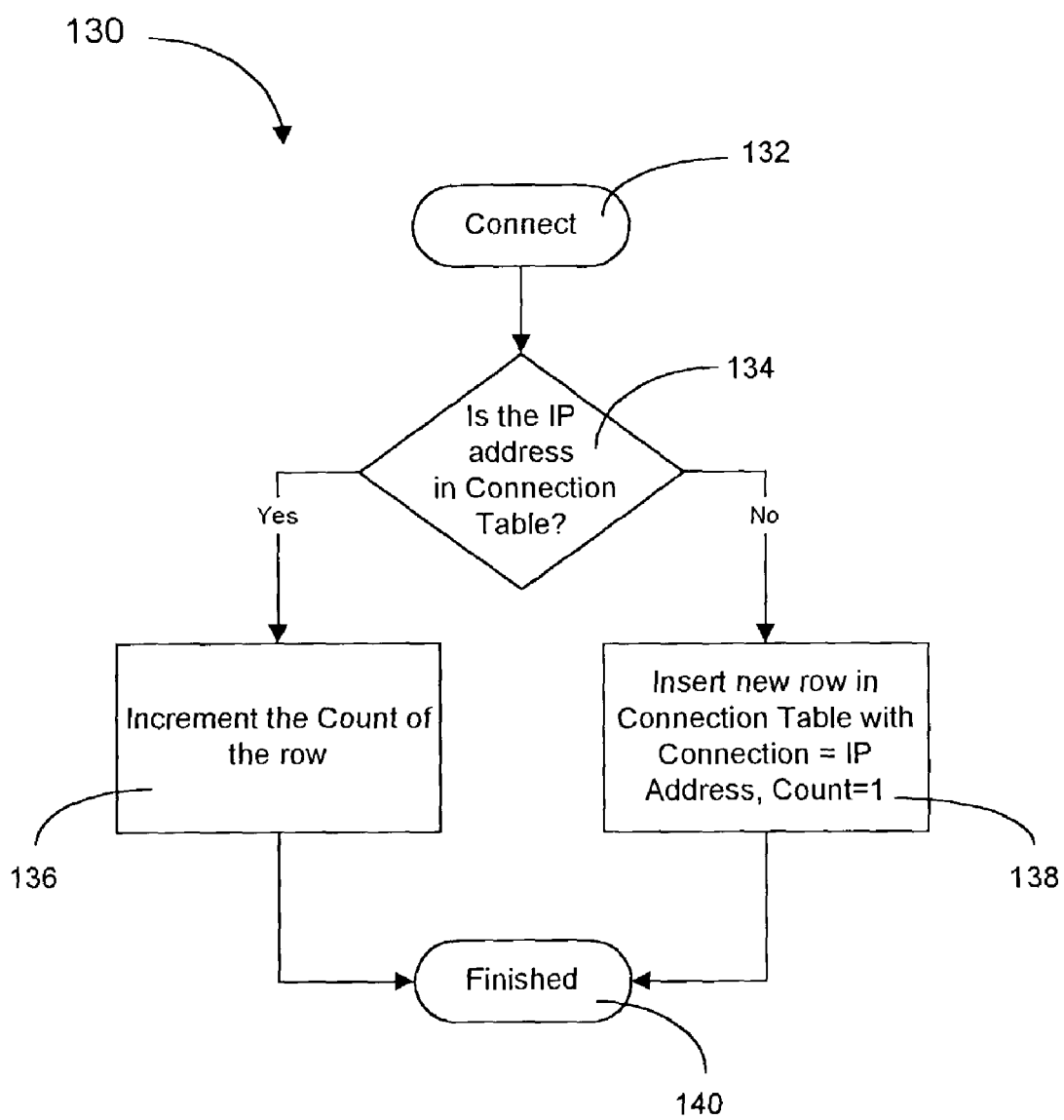
FIG. 7 is a flowchart of the logical flow of establishing a connection.

Referring now to FIG. 7 a flowchart of the logical flow of establishing a connection is shown generally as 130. Beginning at step 132 system 20 has determined that a connection to a host is to be established. A test is made at step 134 to determine if there is a row having the IP address of the host, contained in the "Connection" field of connection table 32. If such a row exists, then there exist multiple connections from the host and processing moves to step 136 where the "Count" field of connection table 32 is incremented. Processing then ends at step 140. Returning to step 134, if the test is negative, this is a new host and processing moves to step 138. At step 138 a new row is added to connection table 32 where the field "Connection" is set to the IP address of the host, and field "Count" is set to the value one. Processing then ends at step 140.

Figure 8:
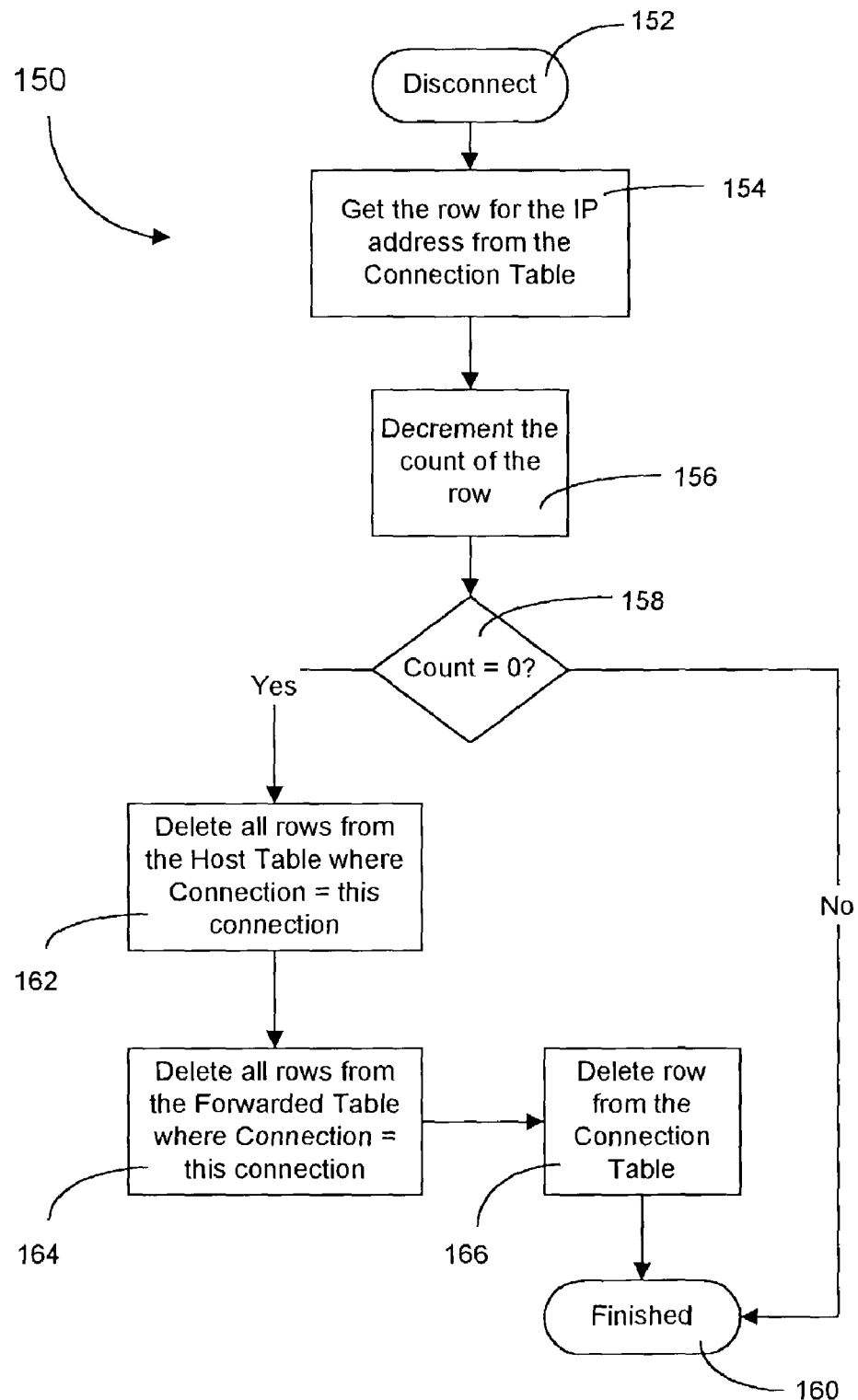
FIG. 8 is a flowchart of the logical flow of terminating a connection.

Referring now to FIG. 8 a flowchart of the logical flow of terminating a connection is shown generally as 150. Beginning at step 152 a connection is disconnected. A connection would be most often disconnected by a host, however, system 20 may choose to disconnect a host based upon a variety of parameters, for example the number of connections it can maintain. At step 154 the row corresponding to the connection to be disconnected is located in connection table 52 and the value of the "Count" field is decremented at step 156. A test is then made at step 158 to determine if the value of the "Count" field is equal to zero. If the test is negative there are still connections from this host, so, processing moves to step 160 where processing ends. If the test at step 158 is positive, processing moves to step 162 where any rows corresponding to the connection are deleted from host table 50. At step 164 all rows in forwarded table 56 corresponding to the connection are deleted. Processing then moves to step 166 where the connection is removed from connection table 52.

Figure 9:
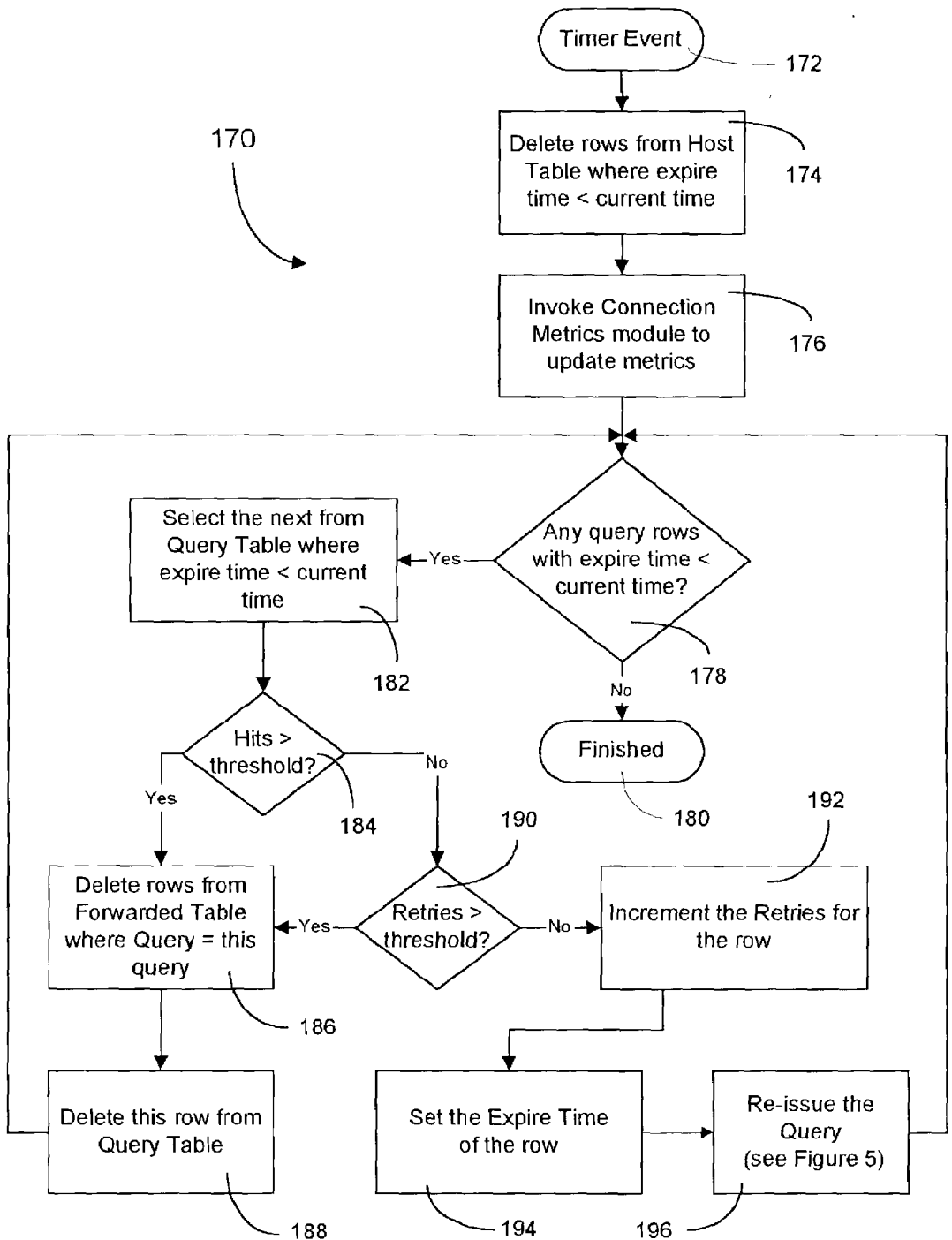
FIG. 9 is a flowchart of the logical flow upon receiving a timer event.

FIG. 9 is a flowchart of the logical flow upon receiving a timer event, shown generally as process 170. Process 170 begins at step 172 when a timer event is received. A timer event may be set by system 20 to trigger at any interval, for example, once every second. Upon receipt of a timer event, processing moves to step 174 where any expired rows in host table 50 are deleted. At step 176 connection metrics module 32 is invoked to update its metrics to reflect any changes. At step 178 a check is made of query table 54 to determine if any queries have expired. If there are no expired queries processing ends at step 180. If there are expired queries, processing moves to step 182 where any expired queries are selected from query table 54. For each selected query, a test is made at step 184 to determine if the value in the "Hits" is above a threshold, if so, the query has completed successfully and processing moves to step 186. At step 186 all rows in forwarded table 56 matching the expired query are deleted. Processing then moves to step 188 where the expired query is deleted from query table 54 and processing returns to step 178 to determine if there are any more expired queries. Returning now to step 184, if the test is negative, processing moves to step 190 where a test is made to determine if the value contained in the "Retries" field of query table 54 is above a threshold. If so, the query has been retried the maximum number of times, and should not be re-tried again and processing moves to step 186. If the test at step 190 indicates the threshold has not been reached, processing moves to step 192, as the query will be retried. At step 192 the value of the field "Retries" for the query in query table 54 is updated and processing moves to step 194. At step 194 the value of the field "Expire Time" for the query in query table 54 is reset, for example to a value of ten minutes past the current time. At step 196 the query is re-issued according to the process described with relation to FIG. 5. Process 170 then returns to step 178.

Figure 10:
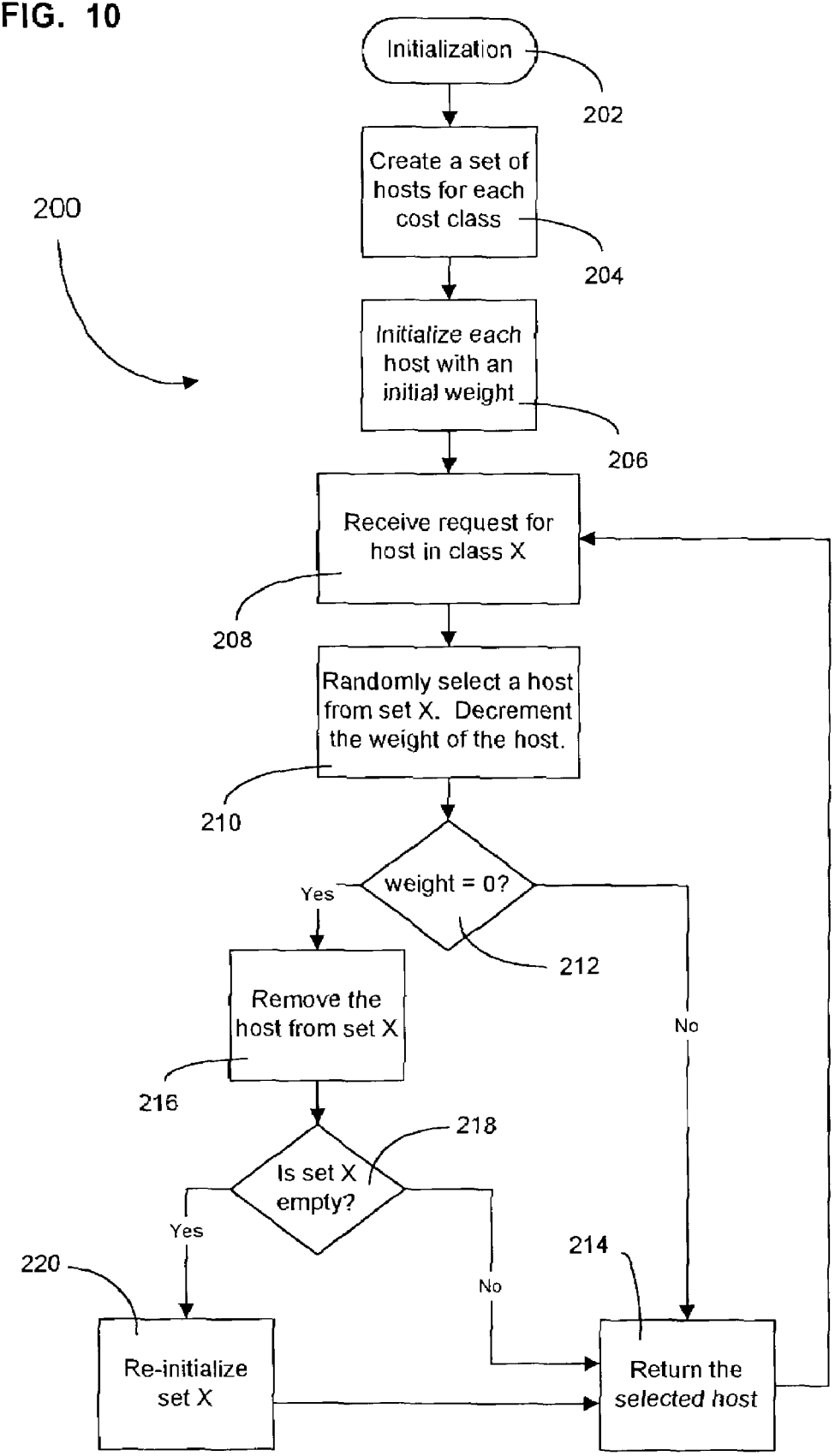
FIG. 10 is a flowchart of the logical flow of a scheduler.

Referring now to FIG. 10 a flowchart of the logical flow of scheduler 34 is shown generally as process 200. At step 202 scheduler 34 receives a request to initialize and moves to step 204. At step 204 a set of connected hosts is created. If route/path module 26 (see FIG. 2) is present, then the sets of connected hosts are created based upon cost class. If not then a single set is created. At step 206 a weight is calculated for each connected host. The weight is calculated utilizing the connection metrics in the connection table 52. A better connection is given a higher weight. Any number of algorithms may be used to calculate the weight of a connection. One example, using the fields (i.e. metrics) of connection table 52 follows.

To calculate the weight, each metric is scaled to a number between 1 and 100 by taking the percentage of the metric compared to the maximum of that metric for all connections. For example, if there are three connections, A, B, and C, and A has total content of 3,000 KB, B has total content of 30,000 KB, and C has total content of 300,000 KB, then A's total content for the weight equation will be 1, B's will be 10, and C's will be 100. Once these scaled metrics have been obtained, the relative weights of each metric may be configured by the user by specifying the relative importance of each metric. The following may be a good choice for some users as it sends queries out to networks that are most likely to provide results:

Total Content: 2
Uptime: 1
Bandwidth: 1
Hit Rate: 10
% Firewalled: 1
From the above:

$$weight=2*Total\ content+1*Uptime+1*Bandwidth+10*Hit\ Rate+1*Firewalled$$

The preceding algorithm serves as a singular example of how scheduler 34 may determine a weight for a specific host. It is not the intent of the inventors to restrict the present invention to this specific means of weighting a host.

At step 208 scheduler 34 receives requests for the "next host" in a specified cost class from query cache module 36. If no cost class information is available, then only a single class exists. At step 210 a host from the corresponding class is randomly selected, and its weight is decreased by one. At step 212 a test is made to determine if the weight associated with a host is now zero. If the weight is not zero, processing moves to step 214 where the selected host is returned to step 208. If at step 212 the weight of the selected host is zero, the host is removed from the set to which it belongs at step 216. At step 218 a test is made to determine if the set to which the host belongs is empty. If it is, the set is reinitialized at step 220 by connection metrics module 32. If the set is not empty processing moves to step 214 where the host removed at step 216 is returned.

In the disclosure the inventors make reference to various threshold values. These values will be set by default, but they may be modified by the user to best match the system requirements of the user. For example, the default value of "Retries" in query table 54 may be adjusted by the user based upon the bandwidth cost of receiving query hits balanced against the amount of memory available to store the data provided in a query hit.

Although the present invention has been described as being implemented in software, one skilled in the art will recognize that it may be implemented in hardware as well. Further, it is the intent of the inventors to include computer readable forms of the invention. Computer readable forms meaning any stored format that may be read by a computing device.

Although the invention has been described with reference to certain specific embodiments, various modifications thereof will be apparent to those skilled in the art without departing from the spirit and scope of the invention as outlined in the claims appended hereto.

We claim:

1. A system for routing messages in a peer to peer network, said system comprising:
   a memory;
   a processor;
   a) a network cache module configured to inspect messages passing through the system and store information relating to hosts in the peer to peer network;
   b) a connection metrics module operatively connected to said network cache module;
   said connections metric module configured to aggregate connection metrics based on the information relating to hosts received from the network cache module, said connection metrics based on an aggregate of values for all hosts reachable through a particular host as a connection, said connection metrics comprising:
   an amount of content available from said connection;
   a percentage of hosts firewalled in the connection;
   a count of queries sent to the connection and query hits received from the connection,
   c) a scheduler module operatively connected to said connection metrics module said scheduler module configured to analyze said connection metrics and rank bests connections based on said connection metrics; and;
   d) a query cache module operatively connected to said scheduler module said query cache module configured to store and forward query messages to a subset of all connections based on said rank of connections.

2. The system of claim 1 further comprising: a host table database, a connection table database, a query table database and a forwarded table database.

3. The system of claim 1 further comprising means for determining a type of message received by said system and forwarding said type of message to an appropriate module.

4. A method of routing messages in a peer to peer network said method comprising the step of:
   inspecting said messages passing through said peer to peer network and storing information relating to hosts in said peer to peer network;
   aggregating connection metrics based on the information relating to hosts, said connection metrics based on values for all hosts reachable through a particular host as a connection, said connection metrics comprising:
   an amount of content available from said connection;
   a percentage of hosts firewalled in the connection;
   a count of queries sent to the connection and query hits received from the connection;
   analyzing said connection metrics and ranking connections based on said connection metrics; and
   storing and forwarding query messages to a subset of connections based on said ranking of connections.

5. The method of claim 4 further comprising the step of upon receiving a host information message, using contents in said host information message to update a network cache.

6. The method of claim 4 further comprising the step of upon receiving a query message using the contents of said query message to update a query cache.

7. The method of claim 4 further comprising the step of upon receiving a query hit message using the contents of said query hit message to update a query cache.

8. The method of claim 4 further comprising the steps of:
   issuing a timer event to track time to connect to a host; and
   if said timer event has expired, discarding the connection metrics for said host.

9. The method of claim 4 further comprising the steps of:
   initiating a timer event for a query message sent to a host;
   if said timer event expires, deleting said query message from a query cache.

10. The method of claim 4 further comprising the step of:
    if a query that has been forwarded to a host has not met a threshold of hits, reissuing said query.

11. The method of claim 4 further comprising the step of:
    when a request is made to connect to a host providing a host from a set of hosts.

12. The method of claim 11 wherein the providing of a host from said set of hosts is done randomly.

13. The method of claim 11 wherein a weight is established for each host, said weight being decremented each time a host is provided, and if said weight reaches zero, removing said host from said set of hosts.

14. The method of claim 11 wherein when all hosts in said set of hosts have been connected to, reinitializing said set of hosts.

15. A computer readable storage medium comprising instructions when executed by a computer causes the instruction to implement a method of:
    inspecting said messages passing through said peer to peer network and storing information relating to hosts in said peer to peer network;
    aggregating connection metrics based on the information relating to hosts, said connection metrics based on values for all hosts reachable through a particular host as a connection, said connection metrics comprising:
    an amount of content available from said connection;
    a percentage of hosts firewalled in the connection;
    a count of queries sent to the connection and query hits received from the connection;
    analyzing said connection metrics and ranking connections based on said connection metrics; and
    storing and forwarding query messages to a subset of connections based on said ranking of connections.

* * * * *